US012776430B2

(12) United States Patent
Ooshima et al.

(10) Patent No.: US 12,776,430 B2
(45) Date of Patent: Oct. 27, 2026

(54) ELECTRONIC COMPONENT

(71) Applicant: Murata Manufacturing Co., Ltd., Nagaokakyo (JP)

(72) Inventors: Tomoya Ooshima, Nagaokakyo (JP); Yuuta Hoshino, Nagaokakyo (JP); Koichi Yamada, Nagaokakyo (JP); Miki Sasaki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 530 days.

(21) Appl. No.: 18/536,992

(22) Filed: Dec. 12, 2023

(65) Prior Publication Data

US 2024/0112835 A1 Apr. 4, 2024

Related U.S. Application Data

(63) Continuation of application No. PCT/JP2022/030676, filed on Aug. 10, 2022.

(30) Foreign Application Priority Data

Nov. 9, 2021 (JP) ................................ 2021-182603

(51) Int. Cl.
*H01C 7/00* (2006.01)
*H01C 1/14* (2006.01)
*H01C 7/04* (2006.01)

(52) U.S. Cl.
CPC .......... *H01C 7/008* (2013.01); *H01C 1/1413* (2013.01); *H01C 7/041* (2013.01)

(58) Field of Classification Search
CPC ........... H01C 7/04; H01C 7/18; H01C 7/008; H01C 1/1413; H01F 17/04; H01F 27/29; H01G 4/2325
See application file for complete search history.

(56) References Cited

U.S. PATENT DOCUMENTS 5,430,429 A * 7/1995 Nakamura .............. H01C 1/02 338/249
6,232,867 B1 * 5/2001 Yoshida .............. H01C 17/285 338/21

(Continued)

FOREIGN PATENT DOCUMENTS

CN 109478465 A 3/2019
JP 2004311676 A 11/2004

(Continued)

OTHER PUBLICATIONS

International Search Report in PCT/JP2022/030676, mailed Nov. 1, 2022, 2 pages.

*Primary Examiner* — Kyung S Lee
(74) *Attorney, Agent, or Firm* — ArentFox Schiff LLP

(57) ABSTRACT

An electronic component that includes: a base body having an outer surface defining a recess with an inner surface, wherein, when the recess is viewed in a direction orthogonal to the outer surface, at least a part of an outer edge of the recess is curved, and when the recess is viewed in a section orthogonal to the outer surface, at least a part of the inner surface of the recess is curved; a wiring inside the base body; and a glass film covering the outer surface of the base body and not covering the inner surface of the recess.

16 Claims, 7 Drawing Sheets

(56) References Cited

U.S. PATENT DOCUMENTS

| | | | | |
|---|---|---|---|---|
| 6,813,137 | B2 * | 11/2004 | Matsuoka .............. | H01C 1/146 29/25.41 |
| 8,339,237 | B2 | 12/2012 | Kajino et al. | |
| 2003/0043012 | A1 * | 3/2003 | Shiraishi ................ | H01C 7/102 338/21 |
| 2004/0169267 | A1 * | 9/2004 | Matsuoka .............. | H01C 1/146 257/684 |
| 2012/0056709 | A1 | 3/2012 | Kajino et al. | |
| 2019/0141825 | A1 | 5/2019 | Cho et al. | |

FOREIGN PATENT DOCUMENTS

| | | | |
|---|---|---|---|
| JP | 2010080703 | A | 4/2010 |
| JP | 2011176238 | A | 9/2011 |
| JP | 2012-059786 | A | 3/2012 |

* cited by examiner

FIG. 13

| Example | Plating | Recess | | | Evaluation | | |
|---|---|---|---|---|---|---|---|
| | Ni layer thickness (μm) | Opening area ($\mu m^2$) | Area ratio (%) | Recess volume ($\mu m^3$) | Thermal shock test | Shock film peeling test | Migration test |
| Example 1 | 2 | 1.8 | 0.1 | 0.5 | G | G | G |
| Example 2 | 4 | 7.1 | 0.5 | 4.1 | G | G | G |
| Example 3 | 6 | 28.5 | 1.8 | 31.8 | G | G | G |
| Example 4 | 8 | 114.7 | 6.8 | 246.9 | G | G | G |
| Example 5 | 10 | 429.0 | 45.4 | 1684.1 | G | G | G |
| Example 6 | 12 | 1963.5 | 58.6 | 16493.4 | G | G | NG |
| Comparative Example 1 | 2 | 0 | 0 | 0 | NG | NG | G |

ELECTRONIC COMPONENT

CROSS REFERENCE TO RELATED APPLICATIONS

The present application is a continuation of International application No. PCT/JP2022/030676, filed Aug. 10, 2022, which claims priority to Japanese Patent Application No. 2021-182603, filed Nov. 9, 2021, the entire contents of each of which are incorporated herein by reference.

TECHNICAL FIELD

The present invention relates to an electronic component.

BACKGROUND ART

The electronic component described in Japanese Patent Application Laid-Open No. 2004-311676 (hereinafter "Patent Document 1") includes a base body and a glass film covering an outer surface of the base body. The glass film covers the outer surface of the base body without leaving any gaps.

SUMMARY OF THE INVENTION

The electronic component described in Patent Document 1 sometimes receives an external shock. When an external shock is applied to the electronic component, a load due to the shock may be concentrated on a specific portion of a surface of the base body. If a large force concentrates on a specific portion, a crack may be formed on the surface of the base body at the specific portion.

In order to solve the above problems, an electronic component according to aspects of the present invention includes: a base body having an outer surface defining a recess with an inner surface, wherein, when the recess is viewed in a direction orthogonal to the outer surface, at least a part of an outer edge of the recess is curved, and when the recess is viewed in a section orthogonal to the outer surface, at least a part of the inner surface of the recess is curved; a wiring inside the base body; and a glass film covering the outer surface of the base body and not covering the inner surface of the recess.

When the above configuration is employed, even if a shock acts on the surface of the base body, the shock is divided at the recess. Thus, it is possible to prevent a shock from acting concentratedly on a specific portion of the surface of the base body. In addition, since at least a part of the outer edge and at least a part of the inner surface of the recess are curved, the direction of shock is easily dispersed at these curved portions. Furthermore, since the inner surface of the recess is not covered with the glass film, it is also possible to prevent an external shock from acting on a specific portion of the inner surface of the recess through the glass film.

It is possible to prevent a shock from becoming concentrated on a specific portion of the surface of the base body.

BRIEF EXPLANATION OF THE DRAWINGS

FIG. 13 is a table showing comparison results of the electronic components between Examples and Comparative Examples.

DETAILED DESCRIPTION OF THE PREFERRED EMBODIMENTS

<Embodiment of Electronic Component>

Figure 1:
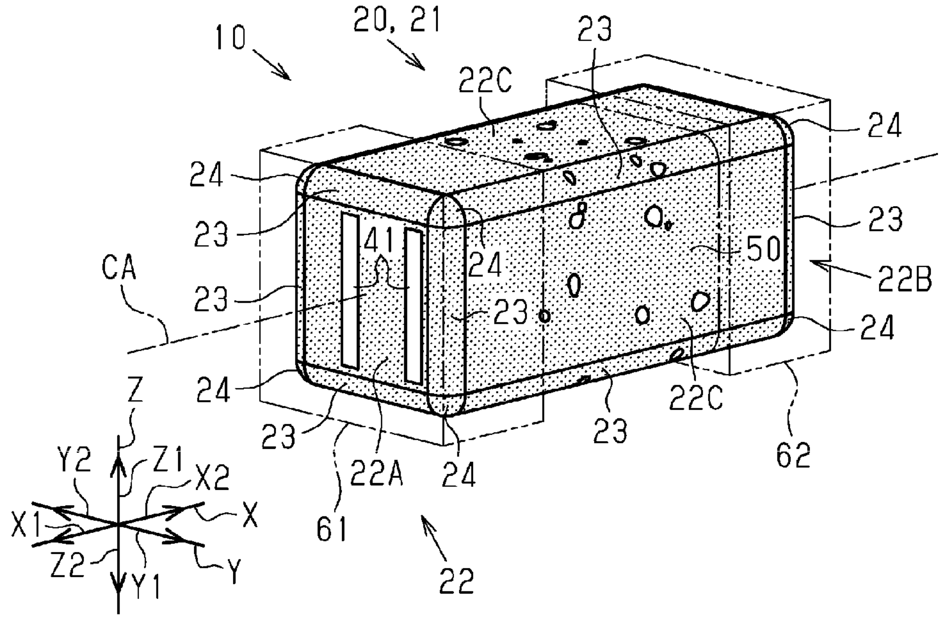
FIG. 1 is a perspective view of an electronic component.

Hereinafter, an embodiment of an electronic component will be described with reference to the drawings. In the drawings, sometimes a component is illustrated while enlarged for the sake of easy understanding. In some cases, a dimension ratio of the component differs from an actual dimension ratio or a dimension ratio of another drawing. Further, although hatching is applied in the sectional view, hatching of some components may be omitted for easy understanding.

(Overall Configuration)

As shown in FIG. 1, an electronic component 10 is, for example, a surface mount negative characteristic thermistor component mounted on a circuit board or the like. The negative characteristic thermistor component has a characteristic that the resistance value decreases as the temperature increases.

The electronic component 10 includes a base body 20. The base body 20 has a substantially quadrangular prism shape and has a central axis CA. Hereinafter, an axis extending along the central axis CA is defined as a first axis X. One of axes orthogonal to the first axis X is defined as a second axis Y. An axis orthogonal to both the first axis X and the second axis Y is defined as a third axis Z. One of the directions along the first axis X is defined as a first positive direction X1, and the direction opposite to the first positive direction X1 among the directions along the first axis X is defined as a first negative direction X2. One of the directions along the second axis Y is defined as a second positive direction Y1, and the direction opposite to the second positive direction Y1 among the directions along the second axis Y is defined as a second negative direction Y2. In addition, one of the directions along the third axis Z is defined as a third positive direction Z1, and the direction opposite to the third positive direction Z1 among the directions along the third axis Z is defined as a third negative direction Z2.

The outer surface 21 of the base body 20 has six planar flat faces 22. The term "face" of the base body 20 as used herein refers to a part that can be observed as a face when the entire base body 20 is observed. That is, for example, even if there are minute irregularities or steps that cannot be found unless a part of the base body 20 is enlarged and observed with a microscope or the like, the face is expressed as a flat face or a curved face. The six flat faces 22 extend in directions different from each other. The six flat faces 22 are roughly divided into a first end surface 22A facing the first positive direction X1, a second end surface 22B facing the first negative direction X2, and four side surfaces 22C. The four side surfaces 22C are a surface facing the third positive direction Z1, a surface facing the third negative direction Z2, a surface facing the second positive direction Y1, and a surface facing the second negative direction Y2, respectively.

An outer surface 21 of the base body 20 has twelve planar boundary surfaces 23. The boundary surface 23 includes a curved surface existing at a boundary between the adjacent flat faces 22. That is, the boundary surface 23 includes, for example, a curved surface formed by round chamfering a corner formed by adjacent flat faces 22.

The outer surface 21 of the base body 20 has eight spherical corner surfaces 24. The corner surface 24 is a boundary portion between three adjacent flat faces 22. In other words, the corner surface 24 includes a curved surface at a position where the three boundary surfaces 23 intersect. That is, the corner surface 24 includes, for example, a curved surface formed by round chamfering a corner formed by the three adjacent flat faces 22.

Figure 2:
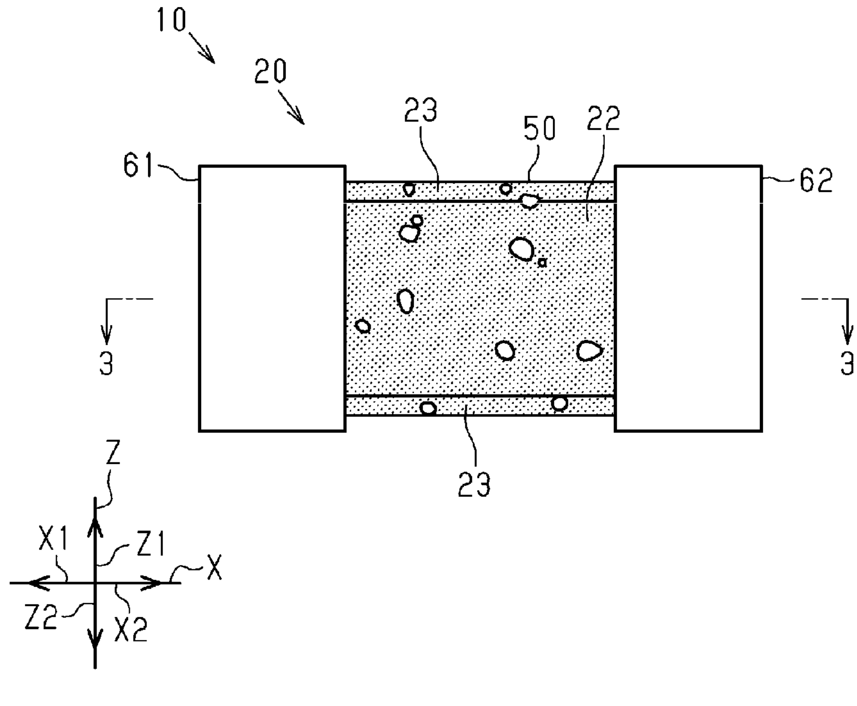
FIG. 2 is a side view of an electronic component.

In FIGS. 1 and 2, a surface of a glass film 50 to be described later is designated by the same reference numeral as the outer surface 21 of the base body 20.

As illustrated in FIG. 2, in the base body 20, a dimension in the direction along the first axis X is larger than a dimension in the direction along the third axis Z. Furthermore, as illustrated in FIG. 1, in the base body 20, the dimension in the direction along the first axis X is larger than a dimension in the direction along the second axis Y. The material of the base body 20 is a semiconductor. Specifically, the material of the base body 20 is a ceramic obtained by firing a metal oxide containing at least one of Mn, Fe, Ni, Co, Ti, Ba, Al, and Zn as a component.

Figure 3:
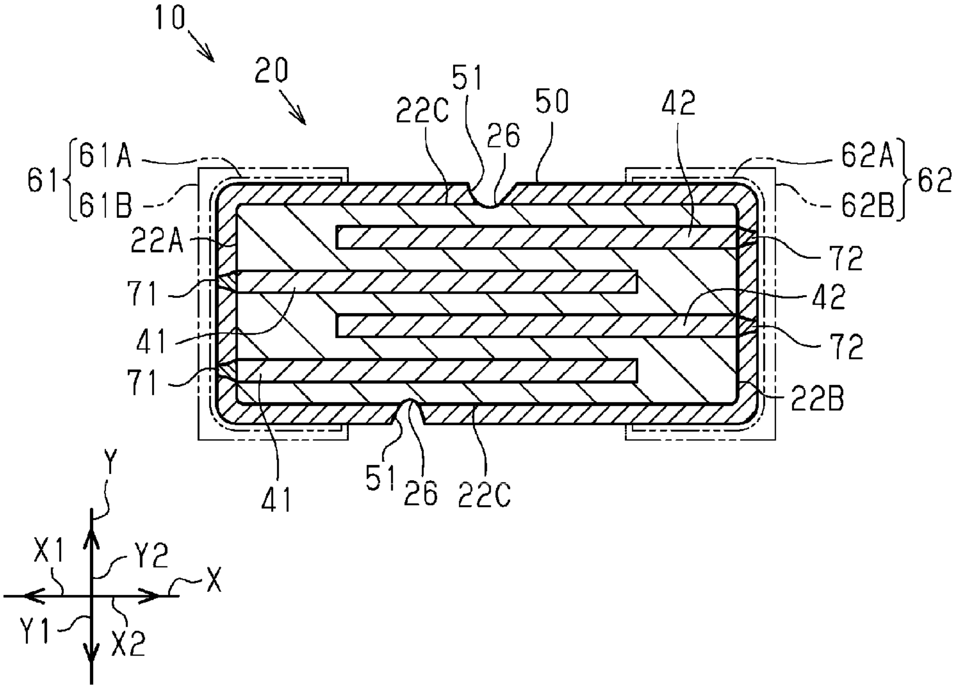
FIG. 3 is a sectional view taken along line 3-3 in FIG. 2.

As illustrated in FIG. 3, the electronic component 10 includes two first internal electrodes 41 and two second internal electrodes 42 as wiring. The first internal electrode 41 and the second internal electrode 42 are embedded in the base body 20.

The material of the first internal electrode 41 is a conductive material. For example, the material of the first internal electrode 41 is palladium. The material of the second internal electrode 42 is the same as the material of the first internal electrode 41.

The first internal electrode 41 has a rectangular plate shape. A principal surface of the first internal electrode 41 is orthogonal to the second axis Y. The second internal electrode 42 has the same rectangular plate shape as the first internal electrode 41. A principal surface of the second internal electrode 42 is orthogonal to the second axis Y, similarly to the first internal electrode 41.

The dimension of the first internal electrode 41 in the direction along the first axis X is smaller than the dimension of the base body 20 in the direction along the first axis X. As illustrated in FIG. 1, the dimension of the first internal electrode 41 in the direction along the third axis Z is approximately ⅔ of the dimension of the base body 20 in the direction along the third axis Z. The dimension of the second internal electrode 42 in each direction is the same as that of the first internal electrode 41.

As illustrated in FIG. 3, the first internal electrodes 41 and the second internal electrodes 42 are located in a staggered manner in the direction along the second axis Y. That is, the first internal electrode 41, the second internal electrode 42, the first internal electrode 41, and the second internal electrode 42 are arranged in this order from the side surface 22C facing the second positive direction Y1 toward the second negative direction Y2. In this embodiment, distances between the internal electrodes in the direction along the second axis Y are equal.

As illustrated in FIG. 1, the two first internal electrodes 41 and the two second internal electrodes 42 are both located at the center of the base body 20 in the direction along the third axis Z. On the other hand, as illustrated in FIG. 3, the first internal electrode 41 is located closer to the first positive direction X1. The second internal electrode 42 is located closer to the first negative direction X2.

Specifically, an end of the first internal electrode 41 on the first positive direction X1 side coincides with an end of the base body 20 on the first positive direction X1 side. An end of the first internal electrode 41 on the first negative direction X2 side is located inside the base body 20 and does not reach an end of the base body 20 on the first negative direction X2 side. On the other hand, an end of the second internal electrode 42 on the first negative direction X2 side coincides with an end of the base body 20 on the first negative direction X2 side. An end of the second internal electrode 42 on the first positive direction X1 side is located inside the base body 20 and does not reach an end of the base body 20 on the first positive direction X1 side.

The electronic component 10 includes a glass film 50. The glass film 50 covers the outer surface 21 of the base body 20. In the present embodiment, the glass film 50 covers the entire region of the outer surface 21 of the base body 20. A material of the glass film 50 is glass. In the present embodiment, the glass is made of silicon dioxide.

As shown in FIG. 3, the electronic component 10 includes a first external electrode 61 and a second external electrode 62. The first external electrode 61 includes a first underlying electrode 61A and a first metal layer 61B. The first underlying electrode 61A is stacked on the glass film 50 in a part including the first end surface 22A in the outer surface 21 of the base body 20. Specifically, the first underlying electrode 61A is a five-face electrode that covers the first end surface 22A of the base body 20 and a portion of four side surfaces 22C on the first positive direction X1 side. In this embodiment, the material of the first underlying electrode 61A is silver and glass.

The first metal layer 61B covers the first underlying electrode 61A from the outside. Thus, the first metal layer 61B is stacked on the first underlying electrode 61A. Although not shown in the drawings, the first metal layer 61B has a two-layer structure in which a nickel layer and a tin layer are disposed in order from the first underlying electrode 61A side. The thickness of the nickel layer is preferably 0.5 μm to 10 μm.

The second external electrode 62 includes a second underlying electrode 62A and a second metal layer 62B. The second underlying electrode 62A is stacked on the glass film 50 in a part including the second end surface 22B in the outer surface 21 of the base body 20. Specifically, the second underlying electrode 62A is a five-face electrode that covers the second end surface 22B of the base body 20 and a portion of four side surfaces 22C on the first negative direction X2 side. In this embodiment, the material of the second underlying electrode 62A is the same as the material of the first external electrode 61, and is silver and glass.

The second metal layer 62B covers the second underlying electrode 62A from the outside. Thus, the second metal layer 62B is stacked on the second underlying electrode 62A. Although not shown in the drawings, the second metal layer 62B has, similarly to the first metal layer 61B, a two-layer structure in which a nickel layer and a tin layer are disposed in order from the second underlying electrode 62A side. The thickness of the nickel layer is preferably 0.5 μm to 10 μm.

The second external electrode 62 does not reach the first external electrode 61 on the side surface 22C, and is disposed away from the first external electrode 61 in the direction along the first axis X. On the side surface 22C of the base body 20, the first external electrode 61 and the second external electrode 62 are not stacked in a central portion in the direction along the first axis X, and the glass film 50 is exposed. In FIGS. 1 and 3, the first external electrode 61 and the second external electrode 62 are indicated by two-dot chain lines.

As illustrated in FIG. 3, the first external electrode 61 and the end of the first internal electrode 41 on the first positive direction X1 side are connected via a first penetrating portion 71 penetrating the glass film 50. Thus, the first external electrode 61 is electrically connected to the first internal electrode 41. Although details will be described later, the first penetrating portion 71 is formed as a result of extension of palladium constituting the first internal electrode 41 toward the first external electrode 61 in the process of manufacturing the electronic component 10.

The second external electrode 62 and the end of the second internal electrode 42 on the first negative direction X2 side are connected via a second penetrating portion 72 penetrating the glass film 50. Thus, the second external electrode 62 is electrically connected to the second internal electrode 42. Similarly to the first penetrating portion 71, the second penetrating portion 72 is formed as a result of extension of palladium constituting the first internal electrode 41 toward the second external electrode 62 in the process of manufacturing the electronic component 10. In FIG. 3, the first internal electrode 41 and the first penetrating portion 71 are illustrated as separate members having a boundary; however, actually, there is no clear boundary therebetween. In this respect, the same applies to the second penetrating portion 72. In FIG. 1, illustration of the first penetrating portion 71 is omitted.

(Through-Hole of Glass Film and Recess of Base Body)

As illustrated in FIG. 3, the glass film 50 has a plurality of through-holes 51. The plurality of through-holes 51 penetrate the glass film 50. The plurality of through-holes 51 exist at portions of the glass film 50 that are covered with neither the first external electrode 61 nor the second external electrode 62.

The base body 20 has a plurality of recesses 26. The plurality of recesses 26 are recessed from the outer surface 21 of the base body 20. Each of the recesses 26 is connected to the inside of a through-hole 51. Therefore, when the electronic component 10 is viewed in a direction orthogonal to the outer surface 21, the recess 26 overlaps a through-hole 51. The plurality of recesses 26 include a recess 26A and a recess 26B both to be described later.

Figure 4:
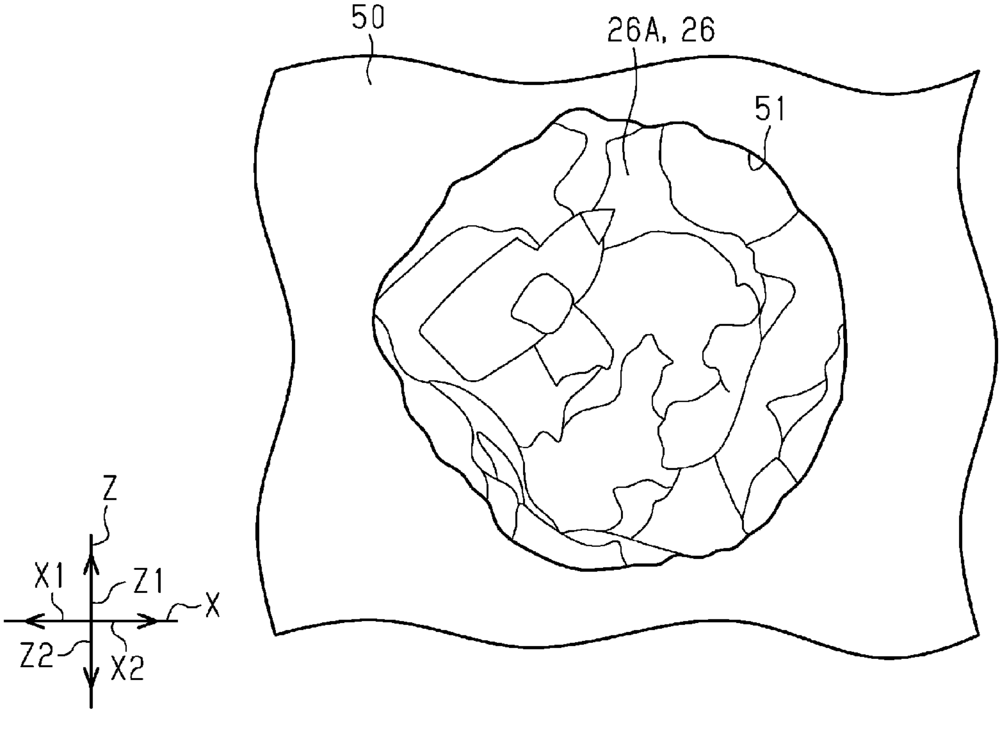
FIG. 4 is an enlarged plan view of a recess.

As illustrated in FIG. 4, when a recess 26A is viewed in a direction orthogonal to the outer surface 21 of the base body 20, the whole of the outer edge of the recess 26A is curved. Specifically, when the recess 26A is viewed in a direction orthogonal to the outer surface 21 of the base body 20, the outer edge of the recess 26A is substantially circular. The outer edge of the recess 26A coincides with an opening of a through-hole 51.

Figure 5:
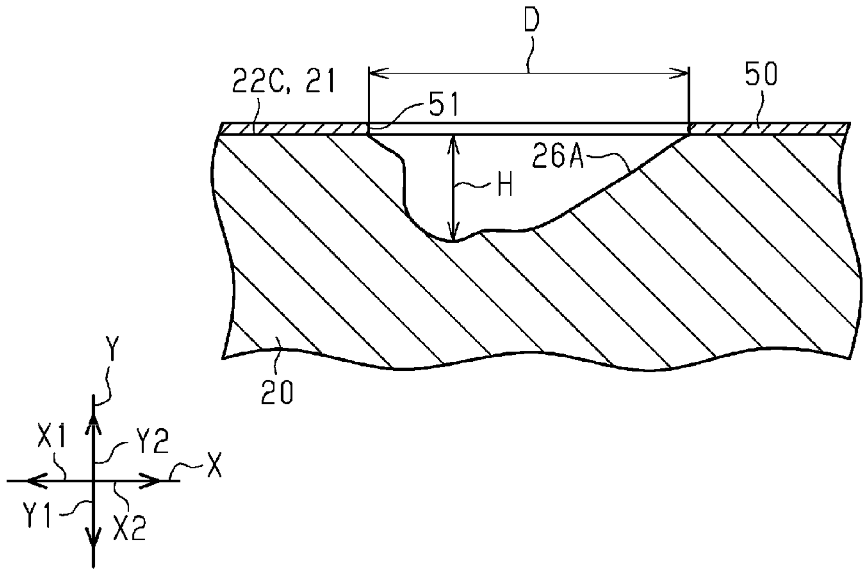
FIG. 5 is an enlarged sectional view of a recess.

As illustrated in FIG. 5, when a recess 26A is viewed in a section orthogonal to the outer surface 21, a part of the inner surface of the recess 26A is curved. In addition, the inner surface of the recess 26A is not covered with the glass film 50. Further, no other member is present in the internal space of the recess 26A, and the space is a void.

When a recess 26A is viewed in a direction orthogonal to the outer surface 21, an area of a region surrounded by the outer edge of the recess 26 is defined as an opening area of the recess 26A. At this time, the opening area of the recess 26A per one recess is 1 $\mu m^2$ to 2000 $\mu m^2$. In the calculation of the opening area of the recess 26A, first, the recess 26A is photographed with an electron microscope viewing in a direction orthogonal to the outer surface 21. Next, the captured image is binarized on the basis of a difference in luminance, saturation, or color to specify the outer edge of the recess 26A. Then, by performing image processing, the area of the region surrounded by the specified outer edge of the recess 26A is calculated as the opening area of the recess 26A.

Furthermore, a segment which passes through the geometric center of the outer edge of the recess 26A and in which a distance from one point to another point on the outer edge of the recess 26A is the longest is defined as an opening diameter D. As described above, the outer edge of the recess 26A is substantially circular. Therefore, when an imaginary circle most approximated to the recess 26A is drawn, the center of the imaginary circle may be regarded as the geometric center, and the diameter of the imaginary circle may be regarded as the longest distance from one point to another point on the outer edge. At this time, in a section being orthogonal to the outer surface 21 and including the opening diameter D, the maximum depth H of the recess 26A with respect to the opening diameter D is 25% to 50%. More specifically, the maximum depth H of the recess 26A with respect to the opening diameter D is 30%. When the recess 26A is viewed in a section orthogonal to the outer surface 21, the maximum depth H of the recess 26A is, in a direction orthogonal to an imaginary line connecting one point and another point on the outer edge of the recess 26A, the longest distance from the imaginary line to the inner surface of the recess 26A.

In addition, the volume of the internal space of the recess 26A is defined as a recess volume. The recess volume is 0.1 $\mu m^3$ to 20000 $\mu m^3$. The recess volume is calculated by assuming the internal space of the recess 26A as a spherical segment. First, the opening diameter D and the maximum depth H of the recess 26A are measured. Next, from these values, the volume of the spherical segment is calculated as the recess volume.

As illustrated in FIG. 4, grain boundaries of a plurality of ceramic particles in the base body 20 exist on the inner surface of the recess 26A. When the electronic component 10 is viewed in a direction orthogonal to the outer surface 21 of the base body 20, neither the first internal electrode 41 nor the second internal electrode 42 is present on the inner surface of the recess 26A. That is, the recess 26A is not so much recessed to expose the first internal electrode 41 and the second internal electrode 42.

Figure 6:
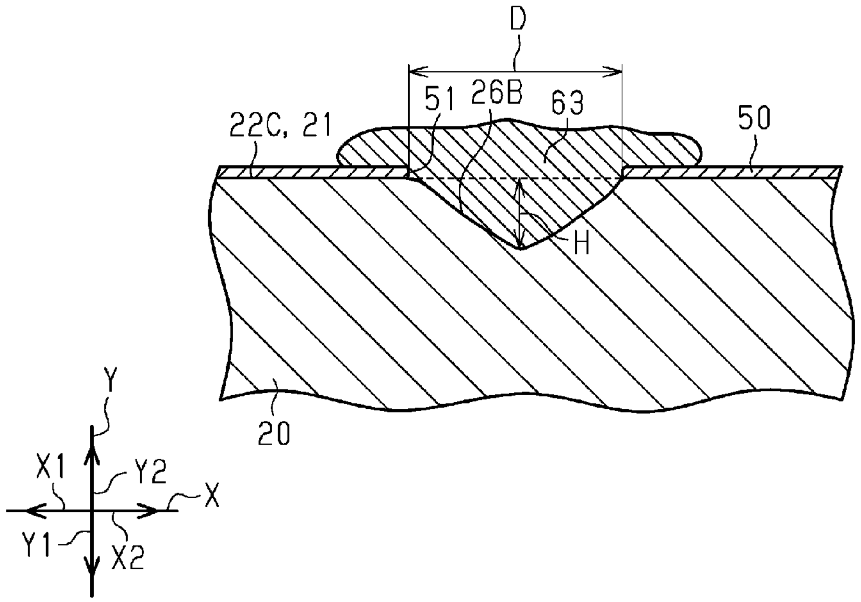
FIG. 6 is an enlarged sectional view of a recess.

As illustrated in FIG. 6, when a recess 26B is viewed in a section orthogonal to the outer surface 21, a part of the inner surface of the recess 26B is curved. In addition, the inner surface of the recess 26B is not covered with the glass film 50.

The electronic component 10 includes a filling material 63. The material of the filling material 63 is tin. The filling material 63 is located in the internal space of the recess 26B. The filling material 63 covers overall the inner surface of the recess 26B. A part of the filling material 63 protrudes from the recess 26B and reaches the outside of the outer edge of the recess 26B. That is, when the electronic component 10 is viewed in a direction orthogonal to the outer surface 21, the filling material 63 covers a range wider than the recess 26B. Therefore, when the electronic component 10 is viewed in a direction orthogonal to the outer surface 21, the outer edge of the filling material 63 covers the vicinity of the recess 26B in the glass film 50. The opening area, the opening diameter D, the maximum depth H, and the recess volume in the recess 26B are the same as those in the recess 26A.

In addition, the ratio of the total value of the opening areas of all the recesses 26 including the recess 26A and the recess 26B to the area of the outer surface 21 is defined as an area ratio. At this time, the area ratio is 0.1% to 60.0%. The area ratio is calculated as described below. First, an image including a measurement range in the side surface 22C of the outer surface 21 is taken. The measurement range is a rectangular range having a first side extending in a direction along the first axis X and a second side extending in a direction orthogonal to the first axis X in one side surface 22C. The dimension of the first side is 0.4 times the dimension in the direction along the first axis X in the electronic component 10. The first side is in contact with neither the first external electrode 61 nor the second external electrode 62. The dimension of the second side is 0.75 times the dimension in the direction orthogonal to the first axis X of the side surface 22C. Next, the image including the measurement range is binarized to distinguish whether or not it is the recess 26. Next, a total value of the opening areas of all the recesses 26 in the measurement range is calculated by image processing. Then, an area ratio that is a ratio of the total value of the opening areas of all the recesses 26 in the measurement range to the area of the measurement range is calculated.

(Method for Manufacturing Electronic Component)

Next, a method of manufacturing the electronic component 10 will be described.

Figure 7:
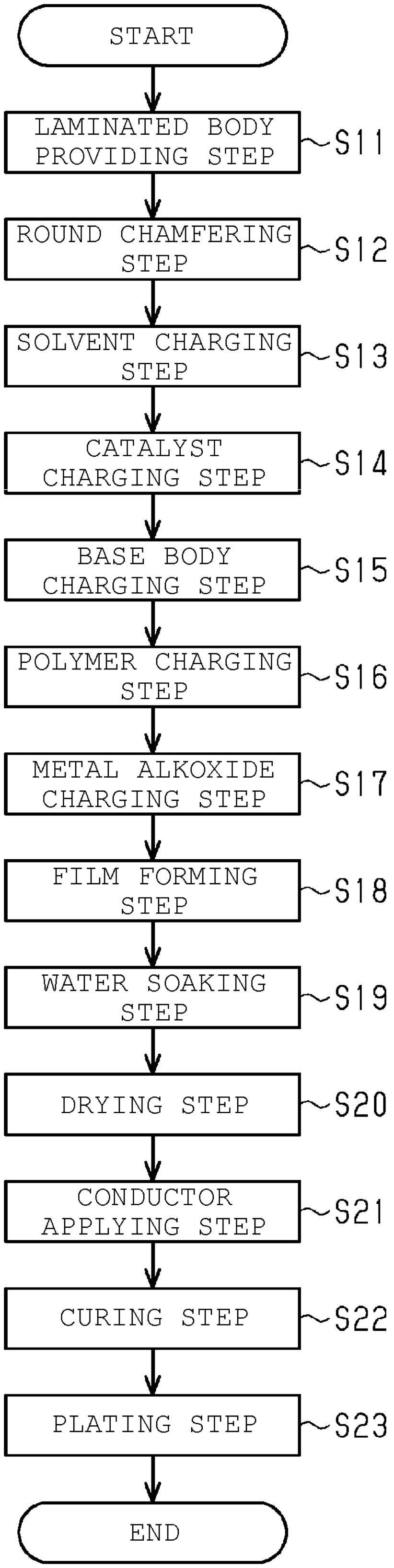
FIG. 7 is an explanatory diagram illustrating the method of manufacturing an electronic component.

As illustrated in FIG. 7, the method of manufacturing the electronic component 10 includes a laminated body providing step S11, a round chamfering step S12, a solvent charging step S13, a catalyst charging step S14, a base body charging step S15, a polymer charging step S16, and a metal alkoxide charging step S17. The method of manufacturing the electronic component 10 further includes a film forming step S18, a water soaking step S19, a drying step S20, a conductor applying step S21, a curing step S22, and a plating step S23.

First, when the base body 20 is formed, in the laminated body providing step S11, a laminated body that is the base body 20 not including the boundary surface 23 and the corner surface 24 is provided. That is, the laminated body is in a state before round chamfering, and has a rectangular parallelepiped shape having the six flat faces 22. For example, first, a plurality of ceramic sheets to be the base body 20 are provided. Each of the sheets has a thin plate shape. A conductive paste to be the first internal electrode 41 is stacked on the sheet. A ceramic sheet to be the base body 20 is stacked on the laminated paste. A conductive paste to be the second internal electrode 42 is stacked on the sheet. In this manner, the ceramic sheet and the conductive paste are stacked. Then, an unfired laminated body is formed by cutting into a predetermined size. Thereafter, the unfired laminated body is fired at a high temperature to provide a laminated body.

Next, the round chamfering step S12 is performed. In the round chamfering step S12, the boundary surface 23 and the corner surface 24 are formed on the laminated body provided in the laminated body providing step S11. For example, a corner of the laminated body is round-chamfered by barrel polishing, whereby the boundary surface 23 having a curved surface and the corner surface 24 having a curved surface are formed. Thus, the base body 20 is formed.

Figure 8:
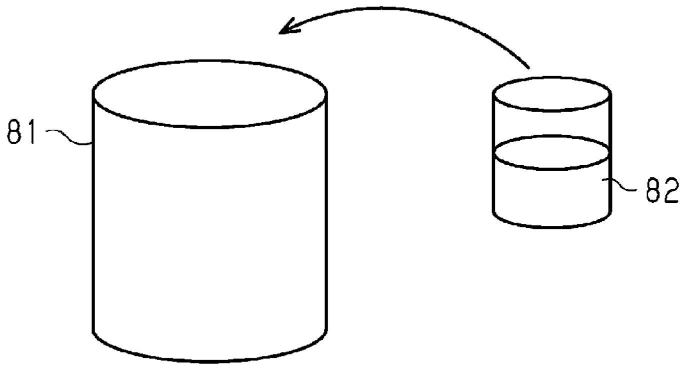
FIG. 8 is an explanatory diagram illustrating the method of manufacturing an electronic component.

Next, the solvent charging step S13 is performed. As illustrated in FIG. 8, in the solvent charging step S13, 2-propanol is charged as a solvent 82 into a reaction vessel 81.

Figure 9:
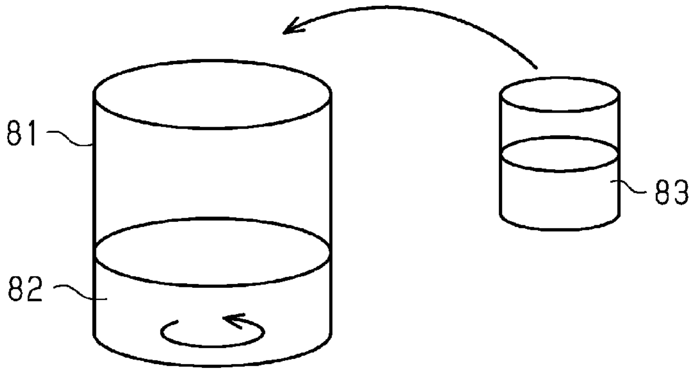
FIG. 9 is an explanatory diagram illustrating a method of manufacturing an electronic component.

Next, as illustrated in FIG. 7, the catalyst charging step S14 is performed. As illustrated in FIG. 9, in the catalyst charging step S14, first, stirring of the solvent 82 in the reaction vessel 81 is started. Then, ammonia water as an aqueous solution 83 containing a catalyst is charged into the reaction vessel 81. The catalyst in this embodiment is a hydroxide ion, and functions as a catalyst that promotes hydrolysis of a metal alkoxide 85 described later.

Figure 10:
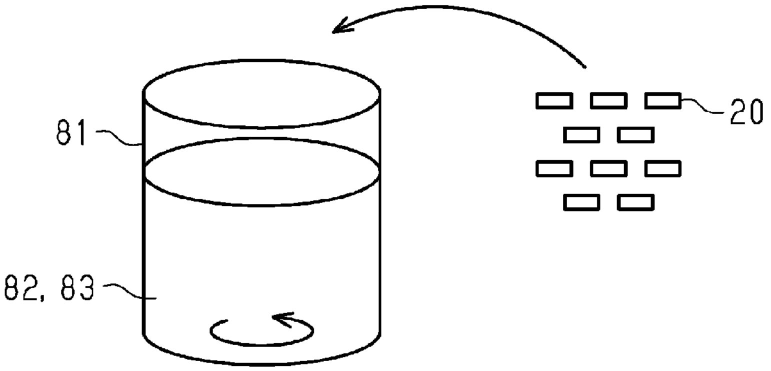
FIG. 10 is an explanatory diagram illustrating the method of manufacturing an electronic component.

Next, as illustrated in FIG. 7, the base body charging step S15 is performed. As illustrated in FIG. 10, in the base body charging step S15, the plurality of base bodies 20 formed in advance in the round chamfering step S12 as described above are charged into the reaction vessel 81.

Figure 11:
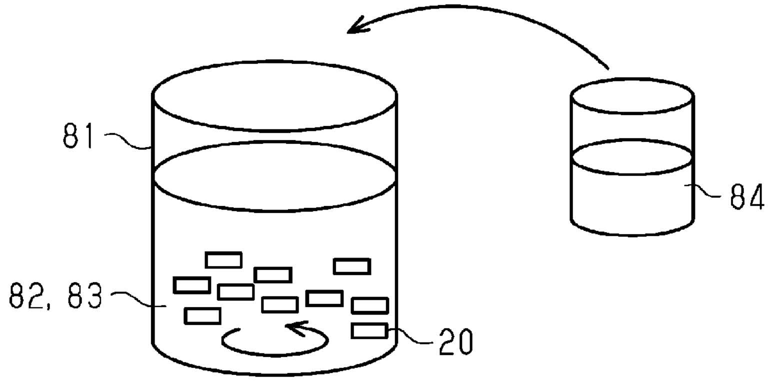
FIG. 11 is an explanatory diagram illustrating the method of manufacturing an electronic component.

Next, as illustrated in FIG. 7, the polymer charging step S16 is performed. As illustrated in FIG. 11, in the polymer charging step S16, polyvinylpyrrolidone is charged as a polymer 84 into the reaction vessel 81. As a result, the polymer 84 charged into the reaction vessel 81 is adsorbed to the outer surface 21 of the base body 20.

Figure 12:
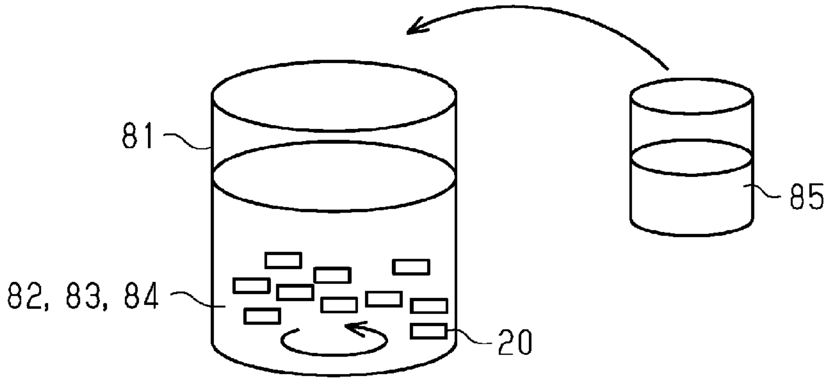
FIG. 12 is an explanatory diagram illustrating the method of manufacturing an electronic component.

Next, as illustrated in FIG. 7, the metal alkoxide charging step S17 is performed. As illustrated in FIG. 12, in the metal alkoxide charging step S17, tetraethyl orthosilicate in a liquid state is charged as the metal alkoxide 85 into the reaction vessel 81. Tetraethyl orthotetrasilicate is sometimes referred to as tetraethoxysilane. In the present embodiment, an amount of the metal alkoxide 85 to be charged in the metal alkoxide charging step S17 is calculated based on an area of the outer surface 21 of the base body 20 charged in the base body charging step S15. Specifically, the calculation is performed by multiplying the amount of the metal alkoxide 85 per one base body 20 necessary for forming the glass film 50 covering the outer surface 21 of the base body 20 by the number of base bodies 20.

Next, as illustrated in FIG. 7, the film forming step S18 is performed. In the film forming step S18, the stirring of the solvent 82 started in the solvent charging step S13 described above is continued for a predetermined time after the metal alkoxide 85 is charged into the reaction vessel 81 in the metal alkoxide charging step S17. In the film forming step S18, the glass film 50 containing the polymer 84 and water is formed through a liquid phase reaction in the reaction vessel 81.

Next, the water soaking step S19 is performed. In the water soaking step S19, after stirring is continued for a predetermined time in the film forming step S18, the base body 20 is taken out from the reaction vessel 81 and then soaked in water. As a result, a part of the polymer 84 adsorbed on the outer surface 21 of the base body 20 is dissolved in the water, so that a part of the glass component of the glass film 50 falls off.

Next, the drying step S20 is performed. In the drying step S20, the base body 20 is taken out from the water and then dried. As a result, the sol-like glass film 50 is dried to become a gel-like glass film 50.

Next, the conductor applying step S21 is performed. In the conductor applying step S21, a conductor paste is applied to two portions of the surface of the glass film 50, that is, a portion including a portion covering the first end surface 22A of the base body 20 and a portion including a portion covering the second end surface 22B of the base body 20. Specifically, the conductor paste is applied to cover the glass film 50 on the entire region of the first end surface 22A and a portion of the four side surfaces 22C. Furthermore, the conductor paste is applied to cover the glass film 50 on the entire region of the second end surface 22B and a portion of the four side surfaces 22C.

Next, the curing step S22 is performed. Specifically, in the curing step S22, the glass film 50 and the base body 20 applied with the conductor paste are heated. As a result, water and the polymer 84 are vaporized from the gel-like glass film 50, so that the glass film 50 covering the outer surface 21 of the base body 20 is fired and cured as illustrated in FIG. 3. At this time, a through-hole 51 penetrating the glass film 50 is formed due to the difference in the amount of thermal shrinkage with a boundary defined by the portion where a part of the glass film 50 has fallen off in the water soaking step S19 described above. At the same time, the conductor paste applied in the conductor applying step S21 is fired to form the first underlying electrode 61A and the second underlying electrode 62A. Thus, the conductor applying step S21 and the curing step S22 constitute an underlying electrode forming step. That is, in the present embodiment, the curing step S22 serves not only as a step of curing the glass film 50 but also as a partial step of the underlying electrode forming step.

In the present embodiment, at the time of heating in the curing step S22, palladium contained on the first internal electrode 41 side is attracted toward the first underlying electrode 61A containing silver due to the Kirkendall effect caused by a difference in diffusion rate between the first internal electrode 41 and the first underlying electrode 61A. As a result, the first penetrating portion 71 penetrates and extends through the glass film 50 from the first internal electrode 41 toward the first underlying electrode 61A, so that the first internal electrode 41 and the first underlying electrode 61A are connected. In this respect, the same applies to the second penetrating portion 72 connecting the second internal electrode 42 and the second underlying electrode 62A.

Next, the plating step S23 is performed. Electroplating is performed on portions of the first underlying electrode 61A and the second underlying electrode 62A. Specifically, in the plating step S23, first, nickel electroplating is performed. As a result, a nickel layer as the first metal layer 61B is formed on a surface of the first underlying electrode 61A. In addition, a nickel layer as the second metal layer 62B is formed on a surface of the second underlying electrode 62A.

As described above, the glass film 50 has the through-hole 51 at the time of the plating step S23. Therefore, a part of the base body 20 is exposed to the outside through the through-hole 51. Then, a part of the base body 20 exposed through the through-hole 51 is eroded by a plating solution to be used at the time of nickel electroplating. As a result, in a portion of the base body 20 exposed through the through-hole 51 is formed a recess 26.

In the plating step S23, next, tin electroplating is performed. As a result, a tin layer as the first metal layer 61B is formed on a surface of the nickel layer as the first metal layer 61B. In addition, a tin layer as the second metal layer 62B is formed on a surface of the nickel layer as the second metal layer 62B. Furthermore, since the base body 20 is a semiconductor, the inside of the recess 26 is also plated. Therefore, a filling material 63 made of tin is formed in some recesses 26B among the plurality of recesses 26. In this way, the electronic component 10 is formed.

(Comparative Test)

Here, the test results of a thermal shock test, a shock film peeling test, and a migration test were compared between Examples 1 to 6 of the electronic component 10 manufactured by the above-described manufacturing method and the electronic component of Comparative Example.

As shown in FIG. 13, in the electronic component 10 of Example 1, the thickness of the nickel layer in each of the first external electrode 61 and the second external electrode 62 is 2 μm. The opening area of the recess 26 of the electronic component 10 of Example 1 is 1.8 $\mu m^2$. The area ratio of the recesses 26 of the electronic component 10 of Example 1 is 0.1%. The recess volume of the recess 26 of the electronic component 10 of Example 1 is 0.5 $\mu m^3$.

In the electronic component 10 of Example 2, the thickness of the nickel layer in each of the first external electrode 61 and the second external electrode 62 is 4 μm. The opening area of the recess 26 of the electronic component 10 of Example 2 is 7.1 $\mu m^2$. The area ratio of the recesses 26 of the electronic component 10 of Example 2 is 0.5%. The recess volume of the recess 26 of the electronic component 10 of Example 2 is 4.1 $\mu m^3$.

In the electronic component 10 of Example 3, the thickness of the nickel layer in each of the first external electrode 61 and the second external electrode 62 is 6 μm. The opening area of the recess 26 of the electronic component 10 of Example 3 is 28.5 $\mu m^2$. The area ratio of the recesses 26 of the electronic component 10 of Example 3 is 1.8%. The recess volume of the recess 26 of the electronic component 10 of Example 3 is 31.8 $\mu m^3$.

In the electronic component 10 of Example 4, the thickness of the nickel layer in each of the first external electrode 61 and the second external electrode 62 is 8 μm. The opening area of the recess 26 of the electronic component 10 of Example 4 is 114.7 $\mu m^2$. The area ratio of the recesses 26 of the electronic component 10 of Example 4 is 6.8%. The recess volume of the recess 26 of the electronic component 10 of Example 4 is 246.9 $\mu m^3$.

In the electronic component 10 of Example 5, the thickness of the nickel layer in each of the first external electrode 61 and the second external electrode 62 is 10 μm. The opening area of the recess 26 of the electronic component 10 of Example 5 is 429.0 $\mu m^2$. The area ratio of the recesses 26 of the electronic component 10 of Example 5 is 45.4%. The recess volume of the recess 26 of the electronic component 10 of Example 5 is 1684.1 $\mu m^3$.

In the electronic component 10 of Example 6, the thickness of the nickel layer in each of the first external electrode 61 and the second external electrode 62 is 12 μm. The opening area of the recess 26 of the electronic component 10 of Example 6 is 1963.5 $\mu m^2$. The area ratio of the recesses 26 of the electronic component 10 of Example 6 is 58.6%. The recess volume of the recess 26 of the recess 26 of the electronic component 10 of Example 6 is 16493.4 $\mu m^3$.

The electronic component of Comparative Example was manufactured with omission of the above-described water soaking step S19. For this reason, the electronic component of Comparative Example does not have through-holes 51 or recesses 26 at all. In the electronic component of Comparative Example, the thickness of the nickel layer in each of the first external electrode 61 and the second external electrode 62 is 2 μm.

The thermal shock test was performed as follows. First, the number of samples of the electronic component to be evaluated was 30. Next, the electronic components to be evaluated were mounted on a substrate. Next, changing the temperature of the substrate on which the electronic component was mounted from −55° C. to 125° C. was defined as one cycle of thermal shock, and this operation was performed for 100 cycles. Thereafter, when the number of cracks present in the glass film 50 increased as compared with that before the thermal shock was applied, the result was evaluated as NG (No Good), and when the number of cracks was not changed, the result was evaluated as G (Good).

The shock film peeling test was performed as follows. First, the number of samples of the electronic component to be evaluated was 1000. Next, the electronic components to be evaluated were placed in one container, and the container was swung such that the electronic components rub against each other. Thereafter, of the 1000 electronic components, when the number of electronic components in which a part of the glass film 50 was peeled off from the base body 20 was 10 or more, the result was evaluated as NG, and when the number was less than 10, the result was evaluated as G.

The migration test was performed as follows. First, the number of samples of the electronic component to be evaluated was 18. Next, the electronic components to be evaluated were mounted on a substrate. Next, the applied voltage was set to 3.2 V or less at a temperature of 125° C. and a humidity of 95%, and the sample was left standing for 72 hours. Thereafter, the presence or absence of occurrence of a short circuit between the external electrodes due to migration was evaluated. Of the 18 electronic components, when the number of electronic components in which migration occurred was 1 or more, the result was evaluated as NG, and when the number of electronic components in which migration occurred was 0, the result was evaluated as G.

With the electronic components 10 of Examples 1 to 6, the evaluation result of the thermal shock test was G. In addition, with the electronic components 10 of Examples 1 to 6, the evaluation result of the shock film peeling test was G. On the other hand, with the electronic component of Comparative Example, the evaluation result of the thermal shock test was NG. In addition, with the electronic component of Comparative Example, the evaluation test of the shock film peeling test was NG.

Note that when a crack was generated in a glass film 50 in the thermal shock test, the shock should have concentratedly acted also on a portion of the surface of the base body 20 corresponding to the crack of the glass film 50. When the glass film 50 is peeled off from the base body 20, a crack is generated in the glass film 50 as a starting point of the peeling. Therefore, a shock should have concentratedly acted also on a portion of the surface of the base body 20 corresponding to the starting point of the peeling of the glass film 50. That is, the fact that both the evaluation result of the thermal shock test and the evaluation result of the shock film peeling test are G means that it has been possible to prevent shock from concentratedly acting on a specific portion of the surface of the base body 20.

Further, with the electronic components 10 of Examples 1 to 5, the evaluation result of the migration test was G. On the other hand, with the electronic component 10 of Example 6, the evaluation result of the migration test was NG.

Operation and Effect of Embodiment (1) According to the above embodiment, even if a shock acts on the outer surface 21 of the base body 20, the shock is divided at the recess 26. Thus, it is possible to prevent a shock from acting concentratedly on a specific portion of the outer surface 21 of the base body 20. In addition, since a part of the outer edge and a part of the inner surface of the recess 26 are curved, the direction of shock is easily dispersed at these curved portions. Furthermore, since the inner surface of the recess 26 is not covered with the glass film 50, it is also possible to prevent an external shock from acting on a specific portion of the inner surface of the recess 26 through the glass film 50.

(2) According to the above embodiment, each of the plurality of recesses 26 is connected to a through-hole 51 of the glass film 50. Therefore, as in the manufacturing method described above, since the recesses 26 can be formed in the plating step S23 for forming the first external electrode 61 and the second external electrode 62, it is not necessary to separately employ a step for forming the recesses 26.

(3) According to the above embodiment, the filling material 63 exists in the internal space of the recess 26B. The filling material 63 is a relatively soft metal, and functions as a buffer that alleviates shock. Therefore, even if a force is applied from the outside of the electronic component 10 toward the recess 26B, it is possible to alleviate the shock by the filling material 63. Therefore, it is possible to alleviate a force applied from the outside of the electronic component 10 from being directly transmitted to the base body 20.

(4) According to the above embodiment, the opening area of the recess 26 is 1 $\mu m^2$ to 2000 $\mu m^2$. That is, the opening area of the recess 26 is not excessively large. Therefore, it is possible to prevent the recess 26 from affecting the strength of the base body 20 due to being excessively large.

(5) According to the above embodiment, the area ratio of the recess 26 is 0.1% to 60.0%. An area ratio in this range can prevent the event that the plurality of recesses 26 are connected to each other to form a large recess and the resulting large recess adversely affect the strength of the base body 20.

(6) According to the above embodiment, the recess volume, which is the volume of the internal space of the recess 26, is 0.1 $\mu m^3$ to 20000 $\mu m^3$. With the recess volume in this range, it is hard to consider that the recess 26 reaches the first internal electrode 41 or the second internal electrode 42.

(7) According to the above embodiment, the maximum depth H of the recess 26A with respect to the opening diameter D of the recess 26A is 25% or more. Since the recess 26A has such a certain magnitude of the maximum depth H, it can reliably exert the force dividing effect when a force acts on a surface of the base body 20. The maximum depth H of the recess 26A with respect to the opening diameter D of the recess 26A is 50% or less. Thus, the recess 26A has a shape elongated in the direction along the outer surface 21 as a whole. Therefore, it is possible to prevent occurrence of cracking or the like in the base body 20 with the recess 26 as a starting point.

Other Embodiments

The above embodiment can be modified as below and be implemented. The above embodiment and the following modifications can be implemented in combination within a range not technically contradictory.

In the above embodiment, the electronic component 10 is not limited to the negative characteristic thermistor component. For example, the electronic component may be a thermistor component other than those having a negative characteristic, a multilayer capacitor component, or an inductor component as long as the inside of the base body 20 is provided with some wiring.

The shape of the base body 20 is not limited to the example of the above embodiment. For example, the base body 20 may have a polygonal columnar shape, other than a quadrangular columnar shape, having a central axis CA. Furthermore, the base body 20 may be a core of a wire-wound inductor component. For example, the core may have a so-called drum core shape. Specifically, the core may have a columnar winding core portion and a flange portion provided at each end of the winding core portion.

The material of the base body 20 is not limited to the example of the above embodiment. For example, the material of the base body 20 may be a composite of a resin and a metal powder.

The outer surface 21 of the base body 20 may not have the boundary surface 23 and the corner surface 24. For example, when a boundary between the adjacent flat faces 22 of the outer surface 21 of the base body 20 does not have a chamfered shape, there is no curved surface at the boundary. Therefore, in some of such a case, neither the boundary surface 23 nor the corner surface 24 exists.

In the above embodiment, the shapes of the first internal electrode 41 and the second internal electrode 42 are not limited as long as they can ensure electrical conduction with the corresponding first external electrode 61 and second external electrode 62. The number of the first internal electrodes 41 and the number of the second internal electrodes 42 are not limited, and the number of the internal electrodes may be one or may be three or more.

The thickness of the nickel layer of the first external electrode 61 may be less than 0.5 μm or may be more than 10 μm. By the manufacturing method of the above embodiment, the recess 26 is formed by nickel electroplating. When the thickness of the nickel layer of the first external electrode 61 is 0.5 μm to 10 μm, the recess 26 can be formed with a size or the like in a range preferable from the viewpoint of the migration test. On the other hand, for example, also when the thickness of the nickel layer of the first external electrode 61 was larger than 10 μm, the evaluation results of the thermal shock test and the shock film peeling test were good. That is, also when the thickness of the nickel layer of the first external electrode 61 is larger than 10 μm, it is possible to prevent a shock from acting concentratedly on a specific portion of the surface of the base body 20. In this respect, the same applies to the second external electrode 62.

The configuration of the first external electrode 61 is not limited to the example of the above embodiment. For example, the first external electrode 61 may include only the first underlying electrode 61A, or the first metal layer 61B may not have the two-layer structure. When the first metal layer 61B has a nickel layer, the recess 26 can be formed in the base body 20 by the manufacturing method disclosed as an example in the embodiment. In this respect, the same applies to the second external electrode 62.

In the above embodiment, the material combination of the first internal electrode 41 and the first underlying electrode 61A is not limited to the combination of palladium and silver. For example, a combination of copper and nickel, copper and silver, silver and gold, nickel and cobalt, or nickel and gold may be used. For example, one may be silver, and the other may be a combination of silver and palladium. For example, one may be palladium and the other may be a combination of silver and palladium, or one may be copper and the other may be a combination of silver and palladium. For example, one may be gold, and the other may be a combination of silver and palladium.

Depending on the combination of the first internal electrode 41 and the first underlying electrode 61A, the Kirkendall effect may not be obtained. In this case, before an external electrode forming step, for example, the first end surface 22A side of the base body 20 only needs to be polished to physically remove a portion of the glass film 50 so that the first internal electrode 41 is exposed. Thereafter, the first internal electrode 41 and the first underlying electrode 61A can be connected by performing the underlying electrode forming step. For example, after the first underlying electrode 61A is formed, the glass film 50 may be formed including the surface of the first underlying electrode 61A, and the glass film 50 covering the surface of the first underlying electrode 61A may be removed. In this respect, the same applies to the material combination of the second internal electrode 42 and the second underlying electrode 62A.

The arrangement place of the first external electrode 61 is not limited to the example of the above embodiment. For example, the first external electrode 61 may be disposed only on the first end surface 22A and one side surface 22C. In this respect, the same applies to the second external electrode 62.

The glass film 50 may not cover the first end surface 22A and the second end surface 22B. The range covered by the glass film 50 may be appropriately changed in accordance with the shape of the base body 20, the positions of the first external electrode 61 and the second external electrode 62, and the like.

In the portion of the glass film 50 covered with the first underlying electrode 61A, glass in the glass film 50 may be diffused into glass in the first underlying electrode 61A to be integrated with each other.

As to the recess 26, the maximum depth H of the recess 26 with respect to the length of the opening diameter D of the recess 26 may be less than 25% or may be greater than 50%. As described above, the relationship between the opening diameter D and the maximum depth H may be appropriately changed depending on the shape of the recess 26. For example, a plurality of recesses 26 may be connected, or the recesses 26 may be recessed considerably deeply.

As to the recess 26, the recess volume may be greater than 20000 $\mu m^3$. For example, when the base body 20 is fairly large, the strength of the base body 20 can be secured also when the recess volume is large to a certain extent.

As to the recess 26, the area ratio of the recess 26 may be greater than 60.0%. For example, when the base body 20 is fairly large, the strength of the base body 20 can be secured also when the area ratio of the recess 26 is great to a certain extent.

As to the recess 26, the opening area may be larger than 2000 $\mu m^2$. For example, when the base body 20 is fairly large, the strength of the base body 20 can be secured also when the opening area is large to a certain extent.

The plurality of recesses 26 may have only one of recesses 26A in which nothing exists in the internal space and recesses 26B in which a filling material 63 exists in the internal space. For example, the plurality of recesses 26 may have no recesses 26B in which the filling material 63 exists in the internal space.

The filling material 63 may not cover overall the inner surface of the recess 26B. That is, the filling material 63 may cover only a part of the inner surface of the recess 26B. In this case, the filling material 63 does not protrude from the recess 26B. That is, when the electronic component 10 is viewed in a direction orthogonal to the outer surface 21, the filling material 63 may cover an area narrower than the recess 26B. The filling material 63 may be located at least in the internal space of the recess 26B.

Regarding the through-hole 51, when the electronic component 10 is viewed in a direction orthogonal to the outer surface 21, the through-hole 51 may have either a size larger than that of the outer edge of the recess 26 or a size smaller than that of the outer edge of the recess 26. When the size of the through-hole 51 is smaller than that of the outer edge of the recess 26, the glass film 50 floats from the inner surface of the recess 26. Also in this case, since the glass film 50 is not in contact with the inner surface of the recess 26, the inner surface of the recess 26 is not covered with the glass film 50.

The method for manufacturing the electronic component 10 is not limited to the example of the above embodiment. For example, the recess 26 may be formed by mechanically cutting, or the glass film 50 may be formed by sticking a sheet-like thin film to the base body 20. In this case, the glass film 50 may not have the through-hole 51.

DESCRIPTION OF REFERENCE SYMBOLS

10: Electronic component
20: Base body
21: Outer surface
26: Recess
41: First internal electrode
42: Second internal electrode
50: Glass film
51: Through-hole
61: First external electrode
62: Second external electrode
63: Filling material
71: First penetrating portion
72: Second penetrating portion
81: Reaction vessel
82: Solvent
83: Aqueous solution
84: Polymer
85: Metal alkoxide

The invention claimed is:

1. An electronic component comprising:

a base body having an outer surface defining a recess with an inner surface, wherein, when the recess is viewed in a direction orthogonal to the outer surface, at least a part of an outer edge of the recess is curved, and when the recess is viewed in a section orthogonal to the outer surface, at least a part of the inner surface of the recess is curved;

a wiring inside the base body; and a glass film covering the outer surface of the base body and not covering the inner surface of the recess.

2. The electronic component according to claim 1, wherein the glass film has a through-hole penetrating the glass film, and the recess is connected to the through-hole.

3. The electronic component according to claim 2, wherein the wiring is an internal electrode, a material of the base body includes a semiconductor, and the electronic component further comprises:

an external electrode electrically connected to the internal electrode and exposed to an outside of the electronic component, wherein the external electrode has a tin layer containing tin, and tin is present in an internal space of the recess.

4. The electronic component according to claim 3, wherein the external electrode has a nickel layer containing nickel, and a thickness of the nickel layer is 0.5 μm to 10 μm.

5. The electronic component according to claim 1, wherein, when the recess is viewed in the direction orthogonal to the outer surface and an area of a region surrounded by the outer edge of the recess is defined as an opening area of the recess, the opening area of the recess is 1 $\mu m^2$ to 2000 $\mu m^2$.

6. The electronic component according to claim 5, wherein, when viewed in the section orthogonal to the outer surface, and the section orthogonal to the outer surface passes through a geometric center of the outer edge of the recess, and in which an opening diameter being a distance from one point on the outer edge of the recess to an opposite point on the outer edge across the geometric center is longest, a maximum depth of the recess with respect to a length of the opening diameter is 25% to 50%.

7. The electronic component according to claim 6, wherein a volume of an internal space per the recess is 0.1 $\mu m^3$ to 20000 $\mu m^3$.

8. The electronic component according to claim 1, wherein a volume of an internal space per the recess is 0.1 $\mu m^3$ to 20000 $\mu m^3$.

9. The electronic component according to claim 1, wherein, when viewed in the section orthogonal to the outer surface, and the section orthogonal to the outer surface passes through a geometric center of the outer edge of the recess, and in which an opening diameter being a distance from one point on the outer edge of the recess to an opposite point on the outer edge across the geometric center is longest, a maximum depth of the recess with respect to a length of the opening diameter is 25% to 50%.

10. The electronic component according to claim 1, further comprising a filling material in an internal space of the recess.

11. The electronic component according to claim 10, wherein the filing material is tin.

12. The electronic component according to claim 1, wherein the recess is a plurality of recesses.

13. The electronic component according to claim 12, wherein, when the plurality of recesses are viewed in the direction orthogonal to the outer surface and an area of a region surrounded by the outer edges of the plurality of recesses are defined as an opening area of the plurality of recesses, a ratio of a total value of the opening areas of all the plurality of recesses to an area of the outer surface is 0.1% to 60.0%.

14. The electronic component according to claim 12, wherein a volume of an internal space of each of the plurality of recesses is 0.1 $\mu m^3$ to 20000 $\mu m^3$.

15. The electronic component according to claim 12, wherein, when viewed in the section orthogonal to the outer surface, and the section orthogonal to the outer surface passes through a geometric center of the outer edges of the plurality of recesses, and in which an opening diameter being a distance from one point on the outer edge of each of the plurality of recesses to an opposite point on the outer edge across the geometric center is longest, a maximum depth of each of the plurality of recesses with respect to a length of the opening diameter thereof is 25% to 50%.

16. The electronic component according to claim 12, wherein, when each of the plurality of recesses are viewed in the direction orthogonal to the outer surface and an area of a region surrounded by the outer edge of each of the plurality of recesses is defined as an opening area of each recess, the opening area of each of the plurality of recesses is 1 $\mu m^2$ to 2000 $\mu m^2$.

* * * * *